United States Patent
Brown et al.

(10) Patent No.: US 6,172,154 B1
(45) Date of Patent: *Jan. 9, 2001

(54) ELASTOMERS COMPOSITIONS WITH DUAL PHASE AGGREGATES AND PRE-VULCANIZATION MODIFIER

(75) Inventors: Trevor Alan Brown, Groton; Meng-Jiao Wang, Lexington, both of MA (US)

(73) Assignee: Cabot Corporation, Boston, MA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/642,681

(22) Filed: May 3, 1996

(51) Int. Cl.[7] ................ C08J 3/02; C08J 5/00; C08K 3/04; C08L 15/00
(52) U.S. Cl. ................ 524/495; 524/492; 524/571; 525/55; 525/99; 525/316; 521/134; 528/376; 523/351
(58) Field of Search .................. 524/495, 492, 524/571; 525/99, 55, 316; 521/134; 528/376

(56) References Cited

U.S. PATENT DOCUMENTS

| 3,048,559 | 8/1962 | Heller et al. |
| 4,029,633 | 6/1977 | Hagopian et al. |
| 5,159,009 | 10/1992 | Wolff et al. ............ 524/495 |
| 5,227,425 | 7/1993 | Rauline. |
| 5,328,949 | 7/1994 | Sandstrom et al. |
| 5,559,169 | 9/1996 | Belmont et al. |
| 5,580,919 | 12/1996 | Agostini et al. ............ 524/430 |

(List continued on next page.)

FOREIGN PATENT DOCUMENTS

| 3600701 | 7/1997 | (DE). |
| 0468140 | 1/1992 | (EP). |
| 620250A1 | 3/1994 | (EP). |
| 731135 | 9/1996 | (EP). |
| 5-112674 | 7/1993 | (JP). |
| WO 96/37546 | 11/1996 | (WO). |
| WO 96/37547 | 11/1996 | (WO). |
| WO9637547 | 11/1996 | (WO). |

OTHER PUBLICATIONS

Silica–Filled, Low Rolling Resistance, Tire Compounding, Presented by Louis Panzer, *Carbon Black World 97*, Mar. 19–21, 1997, Le Mansion Hotel, San Antonio, Texas.

(List continued on next page.)

*Primary Examiner*—Duc Truong

(57) ABSTRACT

Novel elastomeric compositions are disclosed, incorporating silicon-treated carbon black and pre-vulcanization modifier selected from non-silane polysulfidic organo-compounds. The silicon-treated carbon black particulate filler differs chemically and in its performance characteristics from simple mixtures of silica and carbon black fillers. The pre-vulcanization modifier is effective to substantially increase bound rubber content in the product of a non-productive thermomechanical working of a base composition incorporating the silicon-treated carbon black particulate filler and SBR or other such unsaturated elastomer. The thermal working takes place at a maximum temperature sufficient to vulcanize the unsaturated elastomer if it were in the presence of a suitable vulcanization system. The non-vulcanized rubber masterbatch produced by such thermal working, having substantially increased bound rubber content, can be admixed with a vulcanization system in a thermomechanical finishing step carried out at a maximum temperature less than the vulcanization temperature. The resulting composition can be vulcanized by thermomechanical working at or above the vulcanization temperature. The resulting elastomeric compositions in accordance with preferred embodiments are found to have improved performance characteristics, including hysteresis balance of low temperature traction and high temperature rolling resistance.

31 Claims, 3 Drawing Sheets

U.S. PATENT DOCUMENTS

| | | | |
|---|---|---|---|
| 5,674,932 | 10/1997 | Agostini et al. | 524/430 |
| 5,830,930 | 11/1998 | Mahmud et al. | 523/215 |
| 5,877,238 | 3/1999 | Mahmud et al. | 523/215 |
| 5,916,934 | 6/1999 | Mahmud et al. | 523/215 |
| 5,919,841 | 7/1999 | Mahmud et al. | 523/351 |
| 5,948,835 | 9/1999 | Mahmud et al. | 523/215 |
| 5,977,213 | 11/1999 | Mahmud et al. | 523/351 |
| 6,008,272 | 12/1999 | Mahmud et al. | 523/351 |
| 6,028,137 | 2/2000 | Mahmud et al. | 524/596 |

OTHER PUBLICATIONS

Research Disclosure, "Functionalization of Elastomers by Reactive Mixing", No. 362, pp. 308–312 Jun. 1, 1994.

Research Disclosure, "Improved Process for Exxpro™ (BRXP50) Tire Bladder Manufacturing", No. 375, p. 504, Jul. 1, 1995.

International Search Report PCT/US97/07462, Date of Mailing, Sep. 5, 1997.

Natural Rubber Carbon Black Masterbatches from Field Latex by Shukri Bin Abdul Wahab, K.P. NG, Kamarul Baharain Bin Basir and W.P. Chang, Rubber Research Institute of Malaysia, Kuala Lumpur, Malaysia, pp. 29–41, *Proceedings of NR Technology Seminar,* Dec. 1978.

Functionalization of Elastomers by Reactive Mixing by The Malaysian Rubber Producers' Research Association, the Common Fund for Commodities, pp. 308–312, *Research Disclosure,* Jun. 1994.

U.S. Serial Number 09/392,803, entitled "Elastomeric Compounds Incorporating Silicon–Coated Carbon Blacks," by Mahmud, et al., filed Sep. 9, 1999 which is a Continuation of U.S. Application No. 08/750,017, filled Aug. 14, 1997 (U.S. Patent 6,028,137 issued Feb. 22, 2000), which is the U.S. National Phase of PCT/US96/07310, filed May 21, 1996, which is a Continuation in Part of Prior Application No. 08/446,142 filed May 22, 1995 (U.S. Patent 5,830,950 issued Nov. 3, 1998), and a Continuation in Part of U.S. Application No. 08/446,142 filed May 22, 1995 (U.S. Patent 5,877,238 Mar. 2, 1999) and a Continuation in Part of U.S. No 08/528,895 filed Sep. 15, 1995 (abandoned).

U.S. Serial Number 08/937,154 entitled "Silica Coated Carbon Blacks", by Mahmud, et al., filed Sep. 25, 1997, which claims the benefit of U.S. Provisional Application No. 60/026,689 filed Sep. 25, 1996.

ELASTOMERS COMPOSITIONS WITH DUAL PHASE AGGREGATES AND PRE-VULCANIZATION MODIFIER

FIELD OF THE INVENTION

The present invention relates to novel elastomeric compositions incorporating silicon-treated carbon black dispersed in vulcanizable or vulcanized elastomer. More particularly, the inventive subject matter is directed to such compositions further incorporating pre-vulcanization modifier and/or reaction products thereof.

BACKGROUND

It has long been known to use carbon blacks as fillers in the compounding and preparation of elastomeric compositions, most notably for their properties as pigments and reenforcing agents. Carbon blacks are especially useful in the preparation of elastomeric compositions for the manufacture of motor vehicle tires and the like. Elastomeric compounds suitable for tire treads, for example, typically employ carbon black fillers as reenforcing agents to provide high abrasion resistance and good hysterisis balance at different temperatures. The physical properties of the carbon black directly influence the abrasion resistance and hysterisis of the tread compound. Generally, a carbon black with high surface area and small particle size will impart a high abrasion resistance and high hysterisis to the tread compound. Other applications where it is useful to provide an elastomer exhibiting good hysterisis balance include other tire components, such as under tread, wedge compounds, sidewall, carcass, apex, bead filler and wire skim, as well as engine mounts and base compounds used in industrial drive and automotive belts.

Reference here to the desirable property of good hysterisis balance, relates to the fact that elastomers are not completely elastic. Upon repeated deformation, only part of the energy is returned. The lost energy, hysterisis, usually manifests itself in the form of heat. This energy loss plays a positive roll in providing good tire traction, but unfortunately, also occurs during rolling of the tire, resulting in undesirable rolling resistance. Thus, the hysterisis of an elastomeric compound under cyclic deformation is the difference between the energy applied to deform the elastomeric composition and the energy released as the elastomeric composition recovers to its initial undeformed state. Hysterisis is known to be well-characterized by a loss tangent, tan δ, the ratio of the loss modulus to the storage modulus, that is, viscous modulus to elastic modulus. Also characterized as the ratio of energy lost (G") to energy returned (G'), the loss factor tan δ is widely used to indicate tire performance properties. Tan δ values at low temperatures (for example, −30° C. to 0° C.) are used as an indication of wet traction capability, with higher values being desirable. For rolling resistance, typically, measurement may be based on a temperature from the range of 30° C. to 70° C. However, the amplitude of deformation also has a significant effect on hysterisis, so it is known to test a strain sweep from low to high at one or more fixed temperatures. The highest value, tan δ max, is an indicator of rolling resistance, with low tan δ max values being desirable as corresponding to low rolling resistance.

Tires made with a tire tread compound having lower hysterisis measured at higher temperatures, such as 40° C. or higher, will have correspondingly lower rolling resistance, which in turn results in reduced fuel consumption by a vehicle using the tire. A tire tread with higher hysterisis value measured at low temperature, such as 0° C. or lower, will have better wet traction and skid resistance. A tire tread compound demonstrating both low hysterisis at high temperatures and high hysterisis at low temperatures is said to have good hysterisis balance. Since it is highly desirable to provide reenforced elastomeric compositions suitable for tire tread applications and the like, having simultaneously both excellent traction and low rolling resistance, compositions are sought which exhibit high hysterisis at traction conditions and low hysterisis at higher speed rolling conditions. Stated in terms of hysterisis balance, it has long been an objective to develop elastomeric compositions, especially for tire tread application or the like, having higher tan δ values at low temperature, low frequency conditions for good traction, along with lower tan δ max values as measured, for example, at 60° C., with low lost energy (G") versus returned energy (G') for good (that is, low) rolling resistance.

Various grades of silica also are known and used as fillers for elastomeric compositions. Silica alone as a reenforcing agent for elastomer typically yields compositions having poor performance characteristics for tire applications, compared to the results obtained with carbon black alone as a reenforcing agent. It has been theorized that strong filler-filler interaction and poor filler-elastomer interaction may account for the poor performance of silica alone. The silica-elastomer interaction can be improved by chemically bonding the two with a silane coupling agent, such as bis(3-triethoxysilylpropyl) tetra-sulfane, commercially available as Si-69 from Degussa AG, Germany. Coupling agents such as Si-69 are understood to create a chemical linkage between the elastomer and the silica, thereby coupling the silica to the elastomer. When the silica is chemically coupled to the elastomer, certain performance characteristics of the resulting elastomeric composition are enhanced. When incorporated into vehicle tires, for example, such elastomeric compounds provide improved hysterisis balance. Unfortunately, silica fillers typically are more expensive than comparable carbon black fillers, resulting often in an undesirable cost penalty for their use in elastomeric compositions. In addition, silane coupling agents such as Si-69 are quite costly, further exacerbating the cost penalty. Also, elastomer compounds containing silica as the primary reenforcing agent have been found generally to exhibit low thermal conductivity, high electrical resistivity, high density and poor process ability.

Coupling agents suitable for silica fillers are discussed, for example, in U.S. Pat. No. 5,328,949 to Sandstrom et al. As noted there, such coupling agents are generally composed of a silane compound having a constituent component or moiety (the silane portion) capable of reacting with the silica surface and, also, a constituent component or moiety capable of reacting with the elastomer molecule, particularly a sulfur vulcanizable rubber having carbon-to-carbon double bonds or unsaturation. In this manner, the Sandstrom patent states, the coupling agent acts as a connecting bridge between the silica and the rubber and thereby enhances the rubber reinforcement performance of the silica filler. Dithiodipropionic acid is disclosed as the silica coupling agent. The Sandstrom et al. patent further notes the optional inclusion of traditional silane coupling agents along with the dithiodipropionic acid, and carbon black filler along with the silica filler. A report by the Malaysian Rubber Producers Research Association ("the MRPRA report"), *Functionalization of Elastomers by Reactive Mixing*, Research Disclosure—June 1994 (p. 308) shows a vulcanized 60:40 natural rubber:EPDM elastomer blend comprising 50 phr N660 carbon black filler to have less bound rubber (g/g black) in the natural rubber portion and more in the EPDM portion when modified by reaction with chemicals currently employed in accelerated sulfur vulcanization of rubber compounds, including bis-4-(1,1-dimethyl(propyl) phenoldisulfide ("BAPD") and dithiodimorpholine ("DTDM"). The use of dithiodicaprolactam ("DTDC") is shown to yield an increase in both. The modification by mixing at temperatures in excess of 150° C. is said to yield improved properties in the ultimate vulcanizates. An increase is reported for both SPR and EPDM-1 through modification of the elastomer with dithiodicaprolactam during mixing of the elastomer with 50 phr N330 carbon black. Other additives have been suggested for use together with curatives or a vulcanization system, including BCI-MX sold under the trade name Perkalink 900, Akzo Nobel Chemicals, Inc., Akron, Ohio, USA. Such BCI-MX additive is said to serve as an antireversion agent during curing of a composition incorporating CBS, 6PPD, APDS, carbon black (N-375), aromatic oil (Dutrex 729 HP), zinc oxide, stearic acid and sulfur. The MRPRA report and another such report were characterized in Rubber Reviews (published by the Rubber Division, American Chemical Society) as showing modification of elastomers with sulfur donors by mixing at the elevated temperatures typical of the preparation of masterbatches in an internal mixer to achieve low levels of modification both in the absence and presence of carbon black during mixing. Such modification of the elastomers is analogized there to elastomer modification wherein a function (morpholine, caprolactam or alkylphenol mono-sulfide) is bound to the rubber via a sulfur link, and this function later displaced by 2-mercaptobenzothiazole ("MBT") to create a crosslink precursor site on the rubber.

When carbon black alone is used as the reenforcing agent in an elastomeric composition, the carbon black surface provides many sites for interacting with the elastomer. While the use of a coupling agent with carbon black might provide some limited improvement in performance to the resulting elastomeric composition, the improvement is not comparable to that obtained when using a silane coupling agent with silica fillers.

It is an object of the present invention to provide novel elastomeric compositions incorporating fillers and treatment agents which can be readily compounded into the elastomer. It is another object, in accordance with certain preferred embodiments, to provide elastomeric compositions incorporating fillers and treating agents exhibiting good hysterisis balance for application in tire tread and other industrial rubber products and other rubber goods. It is yet another object in accordance with certain embodiments to provide a reenforcing agent which includes silicon-treated carbon black and treatment agent. Other objects and features of the present invention will become apparent from the following description and claims.

SUMMARY

In accordance with a first aspect, a base composition comprises unsaturated elastomer, silicon-treated carbon black particulate filler, and a pre-vulcanization modifier selected from non-silane polysulfidic organo-compounds effective to substantially increase bound rubber content in a non-vulcanized masterbatch composition produced by thermomechanical working of the base composition including at least a non-productive thermal working stage reaching a maximum temperature sufficient to vulcanize the masterbatch if it were in the presence of a vulcanization system. (The term bound rubber as used here is intended to have a meaning consistent with the measurement procedure set forth in the Examples below.) Elastomeric compounds obtained by compounding an elastomer with a silicon-treated carbon black are found to have desirable hysterisis balance and other properties. In such silicon-treated carbon blacks (discussed further below), one or more silicon-containing species, for example, oxides and/or carbides of silicon, are an intrinsic part of the carbon black aggregate, being distributed in at least a portion of the carbon black aggregate either primarily at the surface or throughout the aggregate. These elastomeric compounds with silicon-treated carbon black optionally may further include a coupling agent, such as expensive silane coupling agents to impact performance properties, for example, the commercially available Si-69 material mentioned above, as well as 3-thiocyanatopropyl-triethoxy silane, vinyltriethoxysilane, methacryloxypropyltrimethoxysilane, vinyl-tris-(2-methoxysilane) and mixtures of any of them. While the chemistry of silicon-treated carbon blacks is not yet fully understood, there is indication that the pre-vulcanization modifier comprising non-silane polysulfidic organo-compound(s) disclosed here does not have primary functionality in the nature of a silica coupling agent. Irrespective of their precise mode of operation, however, it will be recognized from the disclosure here, taken together with the detailed description below of certain preferred embodiments, that these novel pre-vulcanization modifiers represent a significant technological advance. In various preferred embodiments the pre-vulcanization modifier enables improved micro-dispersion of the silicon-treated carbon black filler in vinyl-containing elastomers, especially aromatic vinyl elastomers such as SBR. In this regard, increased electrical resistivity has been observed and is believed to indicate substantially reduced filler-to-filler interaction in the resulting elastomeric composition. In addition, certain preferred embodiments are found to provide excellent abrasion resistance. Most notably, preferred embodiments are found to provide lower bulk hysterisis at high temperature and high frequency conditions together also with increased micro-hysterisis at low temperature conditions. Certain of the specific pre-vulcanization modifiers disclosed below have previously been employed as components of multi-component vulcanization systems. It is highly significant in this regard, that the pre-vulcanization modifier is found now to be effective to substantially increase bound rubber content in a non-vulcanized masterbatch composition produced by a non-productive thermomechanical working of the above-disclosed base composition at a temperature which would be sufficient in the presence of a vulcanization system to vulcanize the masterbatch. Use in accordance with the present disclosure as a pre-vulcanization modifier is found, especially in preferred embodiments, to yield elastomeric compositions having excellent improvement in hysterisis balance not afforded by such prior known different usage as a component of a vulcanization system for the elastomer. That is, the pre-vulcanization modifier yields both higher tan δ at low temperatures, such as below 0° C. for excellent wet traction performance in a tire tread application, and simultaneously lower tan δ max at higher temperatures, such as 60° C., with a low ratio of lost energy to energy returned, for example 1% to 10%, for advantageously lowered rolling resistance. These highly surprising results of improved hysterisis balance through the use of a pre-vulcanization modifier together with silicon-treated carbon black fillers will be readily understood by those skilled in the art to represent a commercially significant technological advance.

In accordance with a second significant aspect, a non-vulcanized rubber masterbatch is provided comprising silicon-treated carbon black particulate filler dispersed in unsaturated elastomer with the reaction product of the aforesaid pre-vulcanization modifier selected from non-silane polysulfidic organo-compounds. It will be understood from the discussion immediately above that such non-vulcanized rubber masterbatch can be formed by the non-productive thermomechanical working of the above disclosed base composition. In accordance with a further aspect such rubber masterbatch can be processed in a finishing step in which a sulfur donor vulcanization system or other suitable vulcanization system is compounded with the rubber masterbatch by thermomechanical working at a temperature below the vulcanization temperature. In accordance with yet another aspect, a vulcanized elastomer composition is provided comprising the vulcanization reaction product of the aforesaid rubber masterbatch admixture with suitable vulcanization system. In accordance with yet another novel aspect, a filler pre-mix is provided, comprising silicon-treated carbon black particulate filler and the above-disclosed pre-vulcanization modifier selected from non-silane polysulfidic organo-compounds. The pre-vulcanization modifier, consistent with the foregoing principles, is effective to substantially increase bound rubber content in a non-vulcanized masterbatch composition resulting from a thermomechanical working of the filler pre-mix in a base composition further comprising suitable unsaturated elastomer. Additional aspects, features and advantages of the present invention will be apparent from the following detailed discussion of certain preferred embodiments.

DETAILED DESCRIPTION OF CERTAIN PREFERRED EMBODIMENTS

As noted above regarding the silicon-treated carbon black particulate fillers employed in the compositions disclosed here, their chemistry within the elastomeric compositions is not as yet fully understood. With respect to their morphology, a silicon-containing species, including but not limited to oxides and carbides of silicon, are distributed in at least a portion of a carbon black aggregate as an intrinsic part of the carbon black. The silicon-treated carbon black may have silicon-containing regions primarily at the surface of the carbon black aggregates, or distributed throughout the aggregates, or mixtures of both. The silicon-treated carbon black aggregates do not represent merely a mixture of discrete carbon black aggregates and discrete silica aggregates. Rather, the silicon-treated carbon black aggregates employed in the compositions disclosed here include at least one silicon-containing region either at the surface of or within the carbon black aggregate. When the silicon-treated carbon black is examined under STEM-EDX, the silicon signal corresponding to the silicon-containing species is found to be present in individual carbon black aggregates. By comparison, for example, in a physical mixture of silica and carbon black, STEM-EDX examination reveals distinctly separate silica and carbon black aggregates.

Figure 1:
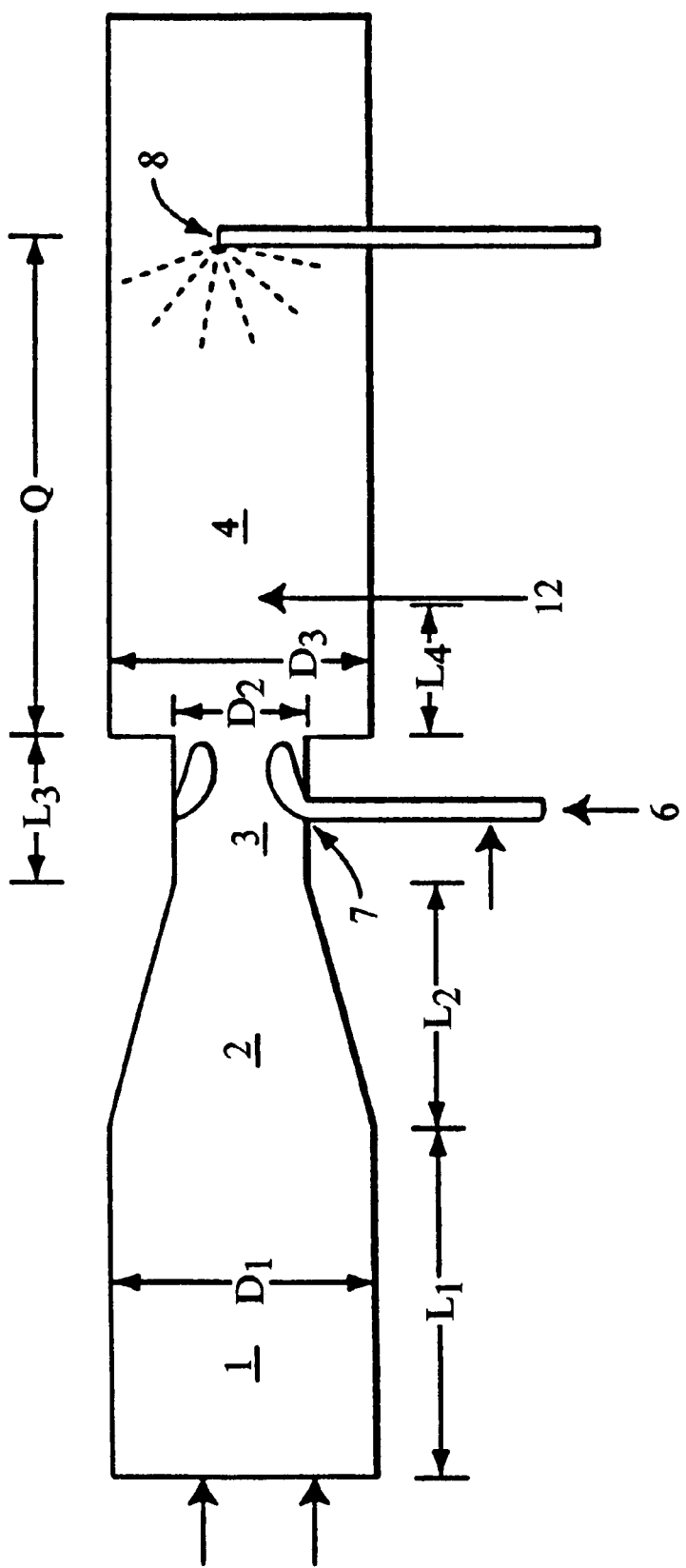
FIG. 1 is a schematic view of a portion of one type of carbon black reactor which may be used to produce silicon-treated carbon blacks suitable for use in elastomeric compositions of the present invention.

The silicon-treated carbon blacks may by obtained by manufacturing the carbon black in the presence of volatilizable silicon-containing compounds. Such carbon blacks are preferably produced in a modular or "staged," furnace carbon black reactor as depicted in FIG. 1. The furnace carbon black reactor has a combustion zone 1, with a zone of converging diameter 2; a feedstock injection zone with restricted diameter 3; and a reaction zone 4. To produce carbon blacks with such reactors, hot combustion gases are generated in combustion zone 1 by contacting a liquid or gaseous fuel with a suitable oxidant stream such as air, oxygen, or mixtures of air and oxygen. Among the fuels suitable for use in contacting the oxidant stream in combustion zone 1, to generate the hot combustion gases, are included any readily combustible gas, vapor, or liquid streams such as natural gas, hydrogen, methane, acetylene, alcohols, or kerosene. It is generally preferred, however, to use fuels having a high content of carbon-containing components, in particular, hydrocarbons. The ratio of air to fuel varies with the type of fuel utilized. When natural gas is used to produce the carbon blacks of the present invention, the ratio of air to fuel may be from about 10:1 to about 1000:1. To facilitate the generation of hot combustible gases, the oxidant stream may be pre-heated. The hot combustible gas stream flows downstream from zones 1 and 2 into zones 3 and 4. The direction of the flow of hot combustion gases is shown in FIG. 1 by the arrow. Carbon black feedstock 6 is introduced at point 7 into the feedstock injection zone 3. The feedstock is injected into the gas stream through nozzles designed for optimal distribution of the oil in the gas stream. Such nozzles may be either single or bi-fluid. Bi-fluid nozzles may use a steam of air to atomize the fuel. Single-fluid nozzles may be adapted to inject pressure atomized feedstock or the feedstock can be directly injected into the gas-stream.

Carbon blacks can be produced by the pyrolysis or partial combustion of any liquid or gaseous hydrocarbon. Preferred carbon black feedstocks include petroleum refinery sources such as decanted oils from catalytic cracking operations, as well as the by-products from coking operations and olefin manufacturing operations. The mixture of carbon black-yielding feedstock and hot combustion gases flows downstream through zone 3 and 4. In the reaction zone portion of the reactor, the feedstock is pyrolyzed to carbon black. The reaction is arrested in the quench zone of the reactor. Quench 8 is located downstream of the reaction zone and sprays a quenching fluid, generally water, into the stream of newly formed carbon black particles. The quench serves to cool the carbon black particles and to reduce the temperature of the gaseous stream and decrease the reaction rate. The distance from the beginning of reaction zone 4 to quench point 8, referred to here as distance "Q," will vary according to the position of the quench. Optionally, quenching may be staged, or take place at several points in the reactor.

After the carbon black is quenched, the cooled gases and carbon black pass downstream into any conventional cooling and separating means whereby the carbon black is recovered. The separation of the carbon black from the gas stream is readily accomplished by conventional means such as a precipitator, cyclone separator, bag filter or other means known to those skilled in the art. After the carbon black has been separated from the gas stream, it is generally subjected to a pelletization step.

The silicon-treated carbon blacks of the present invention may be made by introducing a volatilizable silicon-containing compound into the carbon black reactor at a point upstream of the quench zone. Useful silicon-containing feeds are volatilizable at carbon-black reactor temperatures. Examples include, but are not limited to, silicates such as tetraethoxy orthosilicate (TEDS) and tetramethoxy orthosilicate, silanes such as tetrchlorosilane and trichloromethylsilane, and volatile silicone polymers such as octamethylcyclotetrasiloxane (OMTS). The flow rate of the volatilizable compound will determine the wt. % of silicon in the treated carbon black. The wt. % of silicon in the treated carbon black should range from about 0.1% to 25%, and preferably about 0.5% to about 10%, and most preferably about 2% to about 6%.

The volatilizable compound may be pre-mixed with the carbon black-forming feedstock and introduced with the feedstock into the reaction zone. Alternatively, the volatilizable compound may be introduced to the reaction zone separately form the feedstock injection point. Such introduction may be upstream or downstream from the feedstock injection point, provided the volatilizable compound is introduced upstream from the quench zone. For example, referring to FIG. 1, the volatilizable compound may be introduced to zone Q at point 12 or any other point in the zone. Volatilization and exposure to high temperatures in the reaction zone yields silicon-treated carbon black, such that the silicon or silicon containing species becomes an intrinsic part of the carbon black. As discussed in further detail below, if the vulcanizable compound is introduced substantially simultaneously with the feedstock, the silicon-treated regions are distributed throughout at least a portion of the carbon black aggregate.

In a second embodiment, the volatilizable compound is introduced to the reaction zone at a point after the carbon black formation has commenced but before the reactor stream has been subjected to the quench. In this embodiment, silicon-treated carbon black aggregates are obtained in which a silicon-containing species is present primarily at or near the surface of the carbon black aggregate.

The loading level of silicon-treated carbon black in the elastomeric composition will depend on the specific materials selected for use and on the performance properties desired in the intended application. It will be within the ability of those skilled in the art, given the benefit of the present disclosure, to select suitable loading levels for a given application. Generally, for tire tread applications, for example, 25 to 120 phr filler will be suitable, more preferably 35 to 90 phr filler. Other suitable fillers may be used in conjunction with the silicon-treated carbon black particulate filler, such as various grades of carbon black suitable to the intended application of the composition. Silica also may be used instead of, or in conjunction with, carbon black as a co-filler along with the silicon-treated carbon black. Preferably, such co-filler is a minor portion of the total filler content of the composition.

The pre-vulcanization modifier of the elastomeric compositions disclosed here are non-silane polysulfidic organo-compounds effective to substantially increase bound rubber content in a non-vulcanized masterbatch composition. More specifically, upon thermomechanical working of a base composition comprising the above discussed silicon-treated carbon black particulate filler and the pre-vulcanization modifier with unsaturated elastomer, a non-vulcanized masterbatch composition is produced in which the bound rubber content is substantially increased over the amount of bound rubber which would result from such thermomechanical working of the same base composition without the pre-vulcanization modifier. As used in this context, the bound rubber content of such a resulting masterbatch is substantially increased meaning preferably at least 10%, more preferably 15% to 30% more bound rubber by weight than would be achieved in the corresponding base composition lacking the pre-vulcanization modifier. In accordance with an alternative measurement, the masterbatch produced by the base composition comprising the pre-vulcanization modifier disclosed here has preferably at least 55 wt. % bound rubber, more preferably at least 80 wt. % rubber content. In accordance with preferred embodiments, the base composition typically comprises from 0.5 wt. % to 10.0 wt. % pre-vulcanization modifier, more preferably 2.0 wt. % to 6.0 wt. %.

The precise amount of pre-vulcanization modifier suitable for a given base composition will depend to an extent on the choice of materials, the intensity and duration of the thermomechanical working step to produce the masterbatch, and the performance characteristics and morphology desired in the product. The last mentioned factor will depend, of course, in some measure on the intended application of the product, and the preferred ranges stated here are especially applicable to base compositions and resulting masterbatch compositions intended for tire tread applications. Suitable pre-vulcanization modifiers are commercially available, including non-silane arylphenol polysulfides and non-silane alkylphenol polysulfides, where the alkyl groups and/or aryl groups are selected independently of each other from C1 to C10 moieties, that is, from alkyl and aryl groups containing from 1 to 10 carbons, preferably C3 to C5, more preferably C4. Suitable non-silane alkylphenol polysulfides include, for example tertiary butyl-phenol polysulfide which is commercially available as Rylex 30 from Ferro Corporation, Bedord Chemical, Walton Hills, Ohio, USA. Other suitable pre-vulcanization modifiers include, for example, dithiodimorpholine (DTDM) dicaprolactam disulfide (DCDS). It will be recognized that some such materials, including, for example, Rylex 30, DTDM and DCDS, have heretofore been known as one component of a multi-part vulcanizing system, typically along with an accelerating agent such as a sulfonamide. Use as a pre-vulcanization modifier for a composition comprising silicon-treated carbon black, however, has not heretofore been recognized. Suitability for use in a base composition in accordance with the disclosure here contemplates that an effective accelerator is excluded from the base composition, such that the thermomechanical working of the base composition at a vulcanization temperature will be non-productive. That is, thermomechanical working of the base composition at a temperature which would be sufficient to vulcanize the elastomer in the presence of a vulcanizing system is achieved as a non-productive step by exclusion of such accelerator and/or other components of an effective vulcanization system for the elastomer employed. The amount of pre-vulcanization modifier used in the base composition will impact results achieved in the intermediate and final elastomer products. It will be within the ability of those skilled in the art, given the benefit of the present disclosure, to determine suitable usage levels based on the particular materials chosen, the intended processing parameters and the intended results. In general, in a base composition intended for use in preparing a tire tread elastomer, having about 30 to 120 phr silicon-treated carbon black and employing natural rubber, SBR or the like, a pre-vulcanization modifier consisting primarily of Rylex 30, DTDM and/or DCDS or the like, will be used in an amount of about 0.5 to 10.0 phr, more preferably to 6 phr. Highly preferred pre-vulcanization modifiers are the non-silane polysulfidic organo-compounds exhibiting preventive antioxidant properties in organic polymer systems, including tertiary butyl-phenol polysulfide. Suitable alternative pre-vulcanization modifiers are commercially available or readily prepared, and will be apparent to those skilled in the art, along with their suitable usage levels, given the benefit of the present disclosure. The pre-vulcanization modifier can be provided in the form of a filler pre-mix comprising the above-described silicon-treated carbon black in substantially homogeneous admixture with the pre-vulcanization modifier. Alternatively, the silicon-treated carbon black filler and the pre-vulcanization modifier can be separately or individually admixed with the unsaturated elastomer either prior to or during thermomechanical working to prepare a masterbatch.

The base composition comprising pre-vulcanization modifier, silicon-treated carbon black filler and unsaturated elastomer can be thermomechanically worked to produce masterbatch employing known equipment and techniques. Typically, for example, mechanical working in a suitable mixer, such as an internal mixer or extruder will be carried out for a suitable period of time, generally having a duration of 10 seconds to 20 minutes, and reaching a maximum temperature between 130° C. and 180° C. It will be understood that the precise processing parameters will depend in part on the performance characteristics of the mixing apparatus, the filler loading level, as well as the performance characteristics and morphology desired in the resultant masterbatch. In general, the thermomechanical working should achieve an excellent pre-dispersing of the filler and reactive intermixing of the treating agent. The thermomechanical working can be accomplished in a single thermal step of suitable duration, temperature and intensity, or it can comprise several thermal steps separated by cooling of the composition. A suitable multi-step thermomechanical working process is disclosed, for example, in U.S. Pat. No. 5,227,425 to Rauline, the disclosure of which is hereby incorporated by reference. It will be within the ability of those skilled in the art, given the benefit of the present disclosure, to determine suitable thermomechanical mixing parameters for a given application. It is significant in this regard that this is a non-productive thermomechanical working. The resulting masterbatch can be vulcanized in accordance with known materials and techniques, but in accordance with preferred embodiments, known multi-part vulcanization systems are excluded from the base composition. Thus, the masterbatch produced by thermomechanical working of the base composition comprising the pre-vulcanization modifier is non-vulcanized. In accordance with certain preferred embodiments, vulcanizable compositions are provided comprising the non-vulcanized masterbatch resulting from the non-productive thermomechanical working of the above disclosed base composition, admixed together then with a vulcanization system effective to vulcanize the masterbatch at a suitable vulcanization temperature. In general, the non-vulcanized masterbatch can be vulcanized in accordance with known techniques using commercially known vulcanization systems suited to the choice of unsaturated elastomer(s) in the base composition. In that regard, it should be recognized that some portion of the pre-vulcanization modifier may be present in its original chemical state in the non-vulcanized masterbatch and even in subsequent intermediate and final elastomer products. Typically, however, the rubber masterbatch contains primarily reaction product of the treating agent with the other constituents of the composition.

The compositions disclosed here may be further compounded with one or more coupling agents to further enhance the properties of the resultant elastomeric compound. Useful coupling agents include, for example, silane coupling agents such as bis(3-triethoxysilylpropyl) tetrasulfane (Si-69) and 3-thiocyanatopropyl-triethoxy silane (Si-264), both available from Degussa AG, Germany. Also suitable are vinyltriethoxysilane (Silquest® A151), methacryloxypropyltrimethoxysilane (A174) and vinyl-tris-(2-methoxysilane) (A172), all available from OSi Specialties Corporation, Tarrytown, N.J., USA, suitable mixtures of any of the aforesaid coupling agents also may be used. The coupling agents may be provided as a mixture with a suitable carrier, for example X50-S which is a mixture of Si-69 and N330 carbon black, available from Degussa AG.

The silicon-treated carbon black incorporated in the elastomeric compound of the present invention may be oxidized. Suitable oxidizing agents include, but are not limited to, nitric acid and ozone. Coupling agents which may be used with the oxidized silicon-treated fillers include, but are not limited to, the coupling agents set forth above.

The silicon-treated carbon blacks also may have an organic group attached, as disclosed in the U.S. patent application Ser. No. 356,459, filed Dec. 15, 1994 and entitled "EPDM, HNBR and Butyl Rubber Compositions Containing Carbon Black Products", hereby incorporated by reference herein. Preferred organic groups include aromatic sulfides, represented by the formulas Ar—$S_n$—Ar' or Ar—$S_n$—Ar", wherein Ar and Ar' are independently arylene groups, Ar" is an aryl and n is 1 to 8.

Another set of organic groups which may be attached to the silicon-treated carbon black fillers are organic groups substituted with an ionic or an ionizable group as a functional group, as disclosed, for example, in U.S. patent application Ser. No. 356,660, filed Dec. 15, 1994 and entitled "Reaction of Carbon Black with Diazonium Salts, Resultant Carbon Black Products and Their Uses", the entire disclosure of which is hereby incorporated herein by reference.

The elastomeric compounds of the present invention may be prepared with any suitable unsaturated elastomer, including those useful for compounding with a carbon black. Such elastomers include, but are not limited to, homo- or co-polymers of 1,3-butadiene, styrene, isoprene, isobutylene, 2,3-dimethyl-1,3-butadiene, acrylonitrile, ethylene, and propylene. Preferably, the elastomer has a glass transition temperature (Tg) as measured by differential scanning colorimetry (DSC) ranging from about −120° C. to about 0° C. Examples include, but are not limited to, styrene-butadiene including SBR, natural rubber, polybutadiene, and polyisoprene. Suitable elastomers also include vinyl terminated materials such as vinyl-based silanes, and other elastomers which are peroxide curable. Blends of any of the foregoing may also be used. Preferably the elastomer is sulfur-curable, such as sulfur-vulcanizable elastomer selected from the group consisting of solution SBR, nature rubber, functional solution SBR, emulsion SBR, polybutadiene, polyisoprene and mixtures of any of them.

As noted above, in accordance with one aspect of the present disclosure, a vulcanizable masterbatch composition, is formed by first preparing the base composition then forming a rubber masterbatch via non-productive thermomechanical working in accordance with the principles discussed above, and thereafter performing a finishing step in which a suitable vulcanization system, preferably a sulfur donor vulcanization system, is added to the masterbatch. The vulcanization system is selected to be effective to vulcanize the masterbatch by thermomechanical working at a suitable vulcanization temperature. The vulcanization system may comprise, for example, sulfur donors, activators, accelerators, peroxides and/or other systems used to effect vulcanization of known elastomeric compositions. The thermomechanical working of the aforesaid finishing step is carried out at a temperature below the vulcanization temperature to achieve good dispersion. Thereafter, a vulcanized elastomer composition can be prepared by thermomechanically working the product of the finishing step at a vulcanization temperature. The resultant elastomeric compositions contain the silicon-treated carbon black particulate filler dispersed in the vulcanized elastomer with the reaction product of the non-silane polysulfidic organo-compound(s) employed in the base composition as a pre-vulcanization modifier. Such vulcanized compositions may be used for various elastomeric products, such as vehicle tire tread, industrial rubber products, seals, timing belts, power transmission belting and the like, and other rubber goods. When utilized in tires, the elastomeric compositions disclosed here also may be used for other tire components, for example, the carcass or sidewall.

It will be understood by those skilled in the art, given the benefit of the present disclosure, that the compositions disclosed here may further comprise any of various commonly used additive materials. Processing additives, for example, such as oils, resins, including tacifying resins, plasticizers, pigments, fatty acid, zinc oxide, waxes, anti-oxidants and anti-ozonants, peptizing agents, etc., may be employed in accordance with known techniques at appropriate points during processing. In this regard, in accordance with a significant feature of certain preferred embodiments, sulfur is added to the base composition. That is, sulfur is added to be present in the non-productive thermomechanical working of the base composition. In accordance with one highly preferred embodiment, the unsaturated elastomer is SBR, most preferably has approximately 12% to 90%, preferably 50% of the butadiene mers incorporated at the 1,2-position along the polymer chain (i.e., vinyl), and sulfur is added in the first stage, that is, in the non-productive working of the base composition. Sulfur preferably is added in an amount less than 10 phr, such that the thermomechanical working remains non-productive, notwithstanding that the working temperature reaches or exceeds the vulcanization temperature. Without wishing to be bound by theory, it can be surmised that free crosslinks are being advantageously added to the elastomer compositions comprising silicon-treated carbon black filler. An observed viscosity increase may be preventing or reducing reagglomeration with resultant low hysterisis at high temperature. Good distribution of the filler along the elastomer chain, which is then preserved through curing, with higher polymer viscosity, may explain the improved hysterisis balance. Notably, comparable results are not achieved in this way with standard carbon black in place of the silicon-treated carbon black filler employed in the novel compositions of the present invention. In accordance with the principles discussed above, such optional addition of sulfur to the base composition is done with exclusion of sulfur activators or accelerators or the like to preserve the non-productive nature of the preliminary thermomechanical working of the base composition.

Irrespective of the underlying mechanism, it is highly significant that the vulcanized elastomeric compositions provided here in accordance with preferred embodiments, are found to have significantly improved dynamic hysterisis characteristics. Most notably, improved hysterisis balance is achieved, wherein excellent wet-traction properties are achieved in conjunction with excellent rolling resistance performance characteristics. Preferred embodiments illustrating these advantageous results are further disclosed in the following examples. These examples are intended as illustrations and not as limitations upon the scope of the invention.

EXAMPLES

Examples 1–9

In these examples, the pre-vulcanization modifier (PVM) para-tertiarybutyl phenol polysulfide (APPS), was evaluated as an alternative to a commonly used silica coupling agent, bis-(3-triethoxysilylpropyl) tetrasulfane (TESPT) in a solution polymerized styrene-co-butadiene elastomer filled with either carbon black, a silica-modified carbon black or a silica filler. The elastomer compositions are shown in Table 1. The compositions were prepared in a 390 cc internal mixer using 3 separate stages. The pre-vulcanization modifier, APPS, was mixed with the filler and SBR elastomer in an internal mixer and subjected to thermomechanical working in a non-productive step wherein the batch was released at 160° C.+/−5° C. A second non-productive step, also released at 160° C., was then performed wherein the product of first non-productive step was returned to the mixer and process oil, antidegradents and activator systems were incorporated. The final productive stage involved addition of vulcanization system into the product of the second stage. In this third stage, the batch was released from the mixer at a temperature less than 120° C., so that the composition remains workable.

Nine samples were prepared. In the order shown in Table 1 below (from left to right), the first three samples all had 50 phr Vulcan 7H carbon black filler (commercially available from Cabot Corporation; Vulcan is a registered trademark of Cabot Corporation). As seen in Table 1, the first sample F1 had neither the pre-vulcanization modified nor the coupling agent. The second sample F1CA had the coupling agent TESPT. The third sample had the pre-vulcanization modifier APPS. The next three samples all had 50 phr silicon-modified carbon black Si-CB prepared in the manner described below in Example 10. Sample F2 had neither the coupling agent nor the pre-vulcanization modifier. Sample F2CA had the coupling agent TESPT. Sample F2PVM had the pre-vulcanization modifier APPS. The final three samples all had 55 phr Silica RP 1165 silica filler (commercially available from Rhone-Poulanc, France). Sample F3 had neither the coupling agent nor the pre-vulcanization modifier. Sample F3CA had the coupling agent TESPT. Sample F3PVM had the pre-vulcanization modifier APPS. The amount of coupling agent used was selected based on recommended optimum amounts. Specifically, for sample F1CA with carbon black filler, the 1.50 phr amount was selected based on S. Wolff and U. Gorl, Kautshuk & Gummi Kunstsoffe, 10/91, p. 941–947. For sample F2CA with silica filler, the 3.0 phr amount was selected based on teachings in U.S. Pat. 5,227,425 to Rauline. For each filler, the PVM level was selected to yield the same sulfur level as the corresponding sample with TESPT. (TESPT is 22 wt. % sulfur while APPS is 30 wt % sulfur.)

TABLE 1

| | F1 | F1CA | F1PVM | F2 | F2CA | F2PVM | F3 | F3CA | F3PVM |
|---|---|---|---|---|---|---|---|---|---|
| SSBR[1] | 100 | 100 | 100 | 100 | 100 | 100 | 100 | 100 | 100 |
| VULCAN 7H[2] | 50 | 50 | 50 | — | — | — | — | — | — |
| Silica RP 1165[3] | — | — | — | — | — | — | 55 | 55 | 55 |
| Si-CB[4] | — | — | — | 50 | 50 | 50 | — | — | — |
| TESPT | — | 1.50 | — | — | 3.00 | — | — | 4.40 | — |
| APPS | — | — | 1.12 | — | — | 2.24 | — | — | 3.28 |
| Aromatic Oil | 5.00 | 5.00 | 5.00 | 5.00 | 5.00 | 5.00 | 5.00 | 5.00 | 5.00 |
| Zinc Oxide | 4 | 4 | 4 | 4 | 4 | 4 | 4 | 4 | 4 |
| Stearic Acid | 2 | 2 | 2 | 2 | 2 | 2 | 2 | 2 | 2 |
| 6PPD | 1.5 | 1.5 | 1.5 | 1.5 | 1.5 | 1.5 | 1.5 | 1.5 | 1.5 |
| Wax | 1.5 | 1.5 | 1.5 | 1.5 | 1.5 | 1.5 | 1.5 | 1.5 | 1.5 |
| Curatives | | | | | | | | | |
| Accelerator TBBS | 1.6 | 1.6 | 1.6 | 1.6 | 1.6 | 1.6 | 1.6 | 1.6 | 1.6 |
| Sulfur | 1.4 | 1.4 | 1.4 | 1.4 | 1.4 | 1.4 | 1.4 | 1.4 | 1.4 |
| DPG | 0.5 | 0.5 | 0.5 | 0.5 | 0.5 | 0.5 | 2.0 | 2.0 | 2.0 |

[1] SSBR is a solution manufactured styrene butadiene copolymer, in which the styrene content is 23.5 wt. % and the butadiene has 48 wt. % vinyl content.
[2] Vulcan is a registered trademark of Cabot Corporation, Boston, Massachusetts, USA. Vulcan 7H is carbon black meeting ASTM designation N234.
[3] Silica RP 1165 is a silica filler manufactured by Rhone-Poulanc, France.
[4] CRX 2000 is a silicon-treated N234 carbon black having approximately 9.5% ash content prepared in accordance with Example 10, below.

The samples were tested for viscosity using a rotary shear viscometer at 100° C. with a rotor speed of 2 rpm. The percentage of elastomer which was rendered insoluble by the mixing treatment, termed "Bound Rubber," was determined by the following procedure: A wire mesh cage was check weighed to within 0.0001 g. Approximately 0.5 g of compound was sliced into 4 pieces and placed in the cage which was then secured closed. The sample and cage were then weighed to within 0.0001 g. The cage was submerged in about 100 ml of toluene at room temperature. The solvent was replaced with fresh toluene after the first 24 hours. After four days extraction, the sample and cage were removed and allowed to air dry in a fume hood for four hours. The cage and sample were then transferred to a vacuum oven at room temperature for 16 hours or until constant weight was achieved. The cage with sample was weighed to within 0.0001 g. Calculation of bound rubber (BR) is as follows:

$$\% \, BR = 100\% \, X(C - A - f(B - A))/(p(B - A))$$

Where
$A$ = Cage weight
$B$ = Initial cage and sample weight
$C$ = Final cage and sample weight
$f$ = Carbon black reaction [% based on formulation]
$p$ = Rubber fraction [% based on formulation]

Test specimens of vulcanized rubber were prepared by compressing the selected sample in a mold at 160° C. for a time equal to that required to attain 90% of the increase in torque as measured in an oscillating die rheometer at 160° C. where the die oscillation was 1.7 Hz through an arc of 1°.

Figure 2:
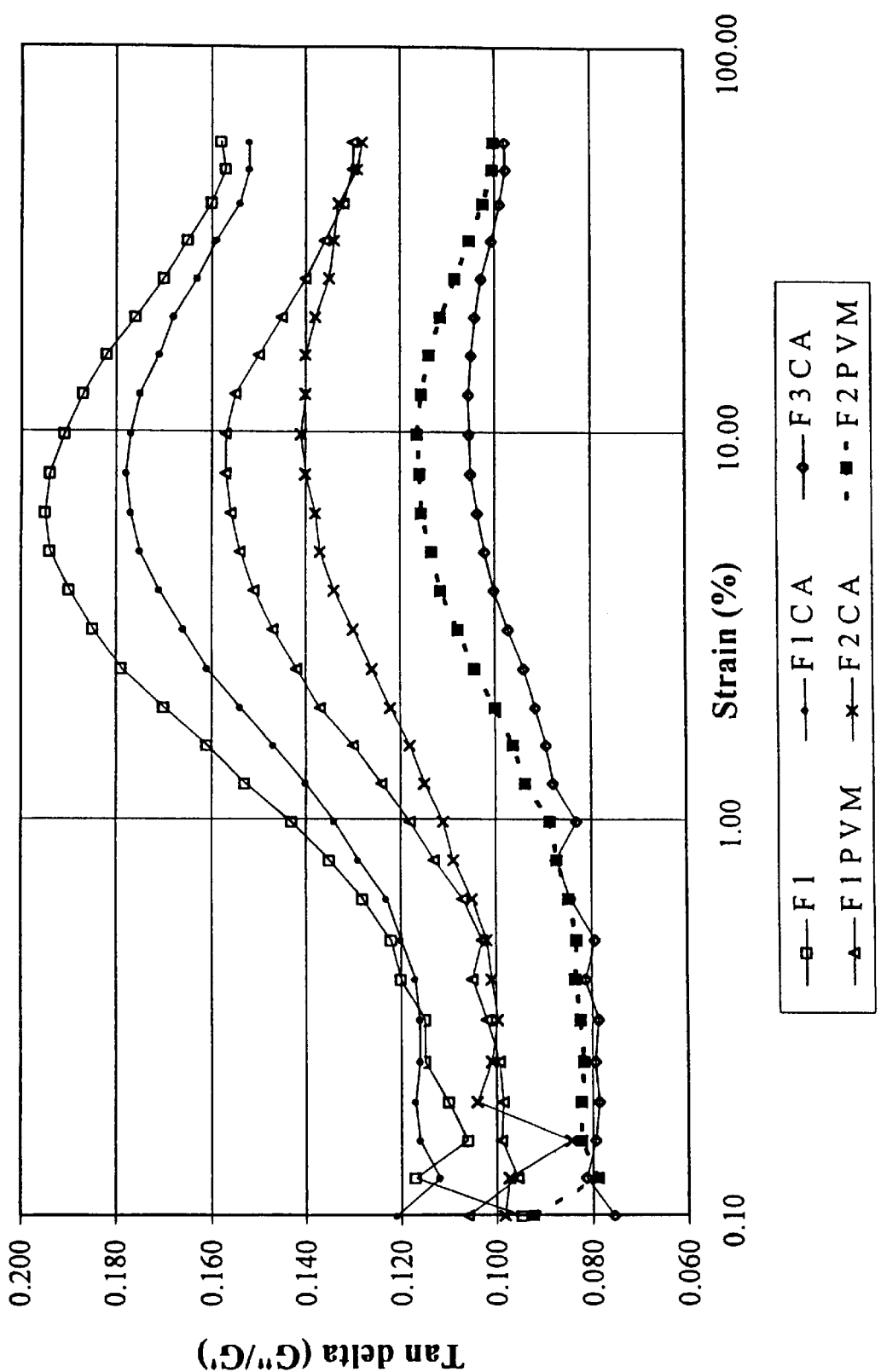
FIG. 2 is a graph showing comparative tan delta figures for elastomeric compositions with and without the pre-vulcanization modifiers disclosed here.
Figure 3:
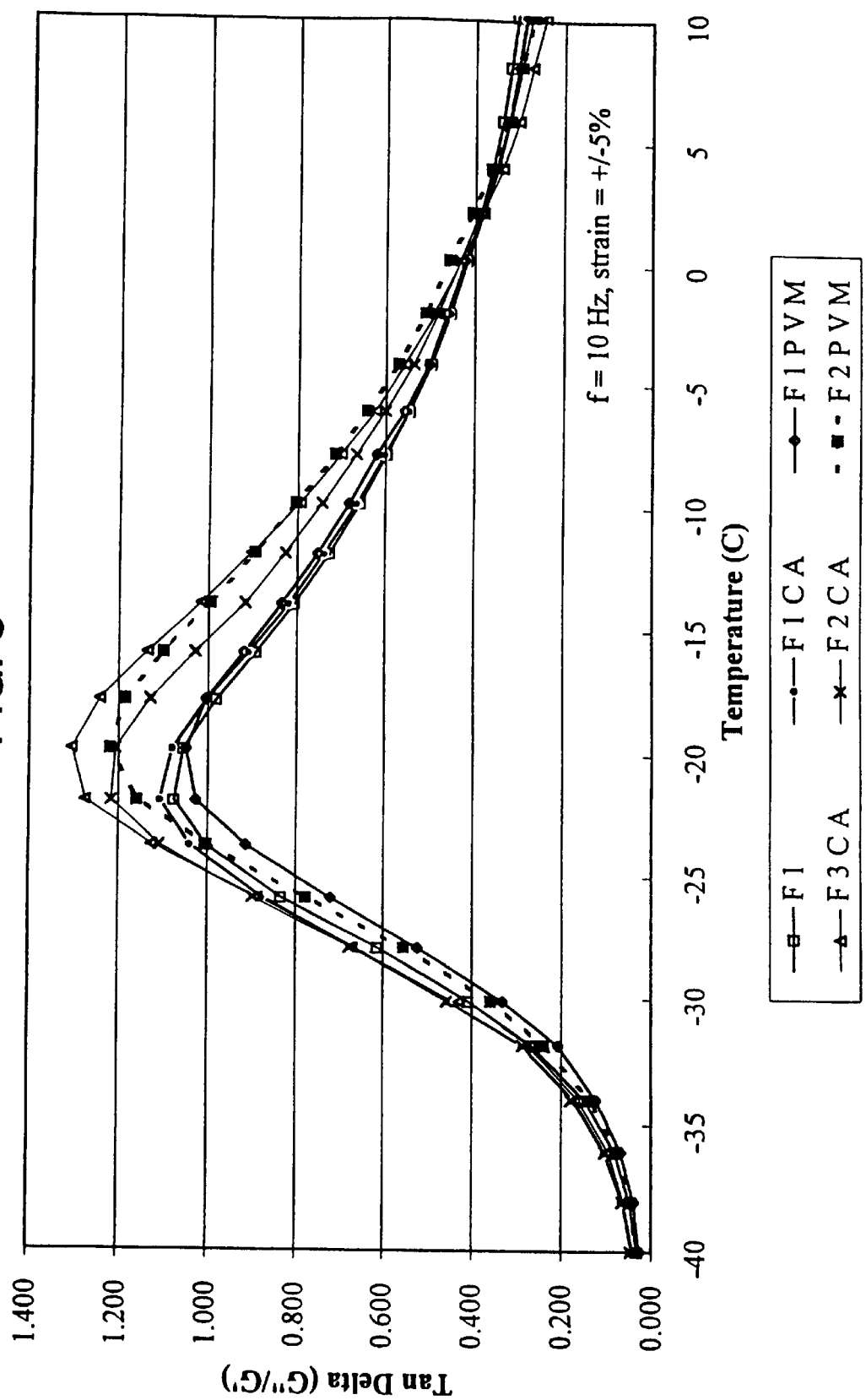
FIG. 3 is a graph showing comparative hysterisis values as a function of temperature for elastomeric compositions with and without the pre-vulcanization modifiers disclosed here.

Cured rubber testing included stress-strain (tensile properties), hardness, electrical resistivity, and dynamic mechanical properties. The results are shown in Table 2 and the dynamic properties are also represented in graphical form in FIGS. 2 and 3.

TABLE 2

| Rheology | F1 | F1CA | F1PVM | F2 | F2CA | F2PVM | F3 | F3CA | F3PVM |
|---|---|---|---|---|---|---|---|---|---|
| Mooney Viscosity | 73.3 | 74.7 | 81.9 | 75.3 | 79.2 | 82.9 | 117 | 83.8 | 117 |
| MDR 1 deg arc, 160 degs C, 100 cpm Minimum Torque (dNm) | 10.5 | 10.7 | 11.1 | 10.8 | 10.4 | 10.9 | 20.1 | 10.1 | 14.5 |
| Scorch ts2 (mins) | 1.9 | 1.8 | 1.7 | 2.2 | 1.8 | 2.1 | 1.8 | 1.8 | 0.8 |
| t90 (mins) | 4.6 | 9.9 | 5.4 | 6.1 | 12.0 | 11.8 | 19.3 | 9.1 | 15.4 |
| Maximum Torque (dNm) | 34.5 | 35.3 | 37.8 | 34.7 | 37.0 | 40.1 | 45.9 | 35.8 | 50.1 |

TABLE 2-continued

| Rheology | F1 | F1CA | F1PVM | F2 | F2CA | F2PVM | F3 | F3CA | F3PVM |
|---|---|---|---|---|---|---|---|---|---|
| Delta Torque (dNm) | 24.0 | 24.6 | 26.7 | 23.9 | 26.6 | 29.2 | 25.8 | 25.7 | 35.6 |
| Curative Properties at RT Stress/Strain | | | | | | | | | |
| Tensile Strength (MPa) | 20.8 | 16.6 | 20.5 | 22.7 | 18.6 | 18.8 | 20.3 | 14.9 | 18.5 |
| 100% Modulus (MPa) | 2.2 | 2.4 | 2.9 | 1.9 | 2.4 | 2.7 | 1.5 | 2.5 | 2.3 |
| 300% Modulus (MPa) | 12.3 | 13.3 | 16.4 | 10.8 | 14.9 | 16.4 | 4.9 | 13.6 | 9.4 |
| Ultimate Elongation (%) | 435 | 350 | 355 | 495 | 345 | 330 | 755 | 320 | 500 |
| Hardness (A) | 67 | 68 | 70 | 64 | 66 | 68 | 68 | 66 | 71 |
| Bound Rubber (%) | 36.6 | 43.9 | 46.9 | 35.2 | 60.4 | 50.5 | 33.6 | 59.7 | 43.7 |
| % change to control | — | 19.9 | 27.9 | — | 71.6 | 43.6 | — | 77.5 | 30 |
| Elec. Resis at RT (Ohm-cm) | 9E + 5 | 2E + 6 | 4E + 6 | 1E + 8 | 4E + 10 | 5E + 10 | >10E12 | >10E12 | >10E12 |
| Dynamic Mechanical Properties RDS, 10 Hz, Strain Sweep | | | | | | | | | |
| Maximum Tan Delta at 60° C. | 0.195 | 0.178 | 0.157 | 0.169 | 0.141 | 0.116 | 0.187 | 0.105 | 0.123 |
| Normalized | 100 | 91 | 81 | 100 | 83 | 69 | 100 | 56 | 66 |

It can be seen from the data in Table 2 that the effect of the coupling agent TESPT and of the pre-vulcanization modifier APPS was to increase the bound rubber and decrease the tangent delta maximum in all 3 filler types, although the PVM appears to be more effective in the carbon black and silica modified carbon black than in the silica filler. Since the tangent delta maximum at 60° C. is an indication of undesirable bulk energy loss under rolling conditions, a lower value is preferred. The contribution to the bulk hysteresis from the filler-filler interaction can be readily seen from the strain dependence of the viscoelastic responses. This is shown graphically in FIG. 2 and the advantageously low strain dependence of the invention is clearly evident.

For acceleration, maneuvering and retardation of a vehicle, particularly for wet pavement conditions, it is desirable to increase the energy loss at the interface of the tire tread with the pavement. Under these traction conditions the tire tread interface is subjected to high frequency deformation where the frequency could be as high as 1 Mhz and the interface temperature of the order of 120° C. or higher (R. Bond and G. Morton, Polymer, Vol. 25, January '84, p132–140). Such conditions are not easily duplicated in the laboratory and it is common to utilize the time=temperature superposition principle of Williams, Landel and Ferry (M. Williams, R. Landel and J. Ferry, J. Polymer Sci Vol 77, July '55. p3701–3707). It is shown there that frequency and temperatures may be superposed, thus enabling a low frequency/low temperature test to represent higher frequency and temperature conditions. To this end the lower temperature response of the viscoelastic curve is used to estimate the traction potential. The tan delta for the above samples is shown graphically in FIG. 3 wherein it can be seen that neither the coupling agent nor the PVM affect the low temperature tan delta peak in the carbon black sample. However, the for the silica modified carbon black the PVM increases the tan delta values as does the coupling agent. This indicates a higher, more desirable wet traction potential.

Example 10

Silicon-treated carbon blacks according to the present invention were prepared using a pilot scale reactor generally as described above, and as depicted in FIG. 1 and having the dimensions set forth below: $D_1$=4 inches, $D_2$=2 inches, $D_3$=5 inches, $L_1$=4 inches, $L_2$=5 inches, $L_3$=7 inches, $L_4$=1 foot and Q=4.5 feet. The reaction conditions set forth in Table 3 below, were employed.

These conditions result in the formation of a carbon black identified by the ASTM designation N234. A commercially available example of N234 is Vulcan® 7H from Cabot Corporation, Boston, Mass. These conditions were altered by adding a volatilizable silicon-containing compound into the reactor, to obtain a silicon-treated carbon black. The flow rate of the volatilizable compound was adjusted to alter the weight percent of silicon in the treated carbon black. The weight percent of silicon in the treated carbon black was determined by the ashing test, conducted according to ASTM procedure D-1506.

Specifically, the silicon-treated carbon black was made by injecting an organo-silicon compound, namely octamethylcyclotetrasiloxane (OMTS), into the hydrocarbon feedstock. This compound is sold as "D4" by Dow Corning Corporation, Midland, Mich. The resultant silicon-treated carbon black is identified herein as OMTS-CB.

Since changes in reactor temperature are known to alter the surface area of the carbon black, and reactor temperature is very sensitive to the total flow rate of the feedstock in the injection zone (zone 3 in FIG. 1), the feedstock flow rate was adjusted downward to approximately compensate for the introduction of the volatilizable silicon-containing compound, such that a constant reactor temperature was maintained. This results in approximately constant external surface area (as measured by t area) for the resultant carbon blacks. All other conditions were maintained as necessary for manufacturing N234 carbon black. A structure control additive (potassium acetate solution) was injected into the feedstock to maintain the specification structure of the N234 carbon black. The flow rate of this additive was maintained constant in making the silicon-treated Cbs described throughout the following examples.

The external surface area (t-area) was measured following the sample preparation and measurement procedure described in ASTM D3037—Method A for Nitrogen surface area. For this measurement, the nitrogen adsorption isotherm was extended up to 0.55 relative pressure. The relative pressure is the pressure (P) divided by the saturation pressure ($P_0$) (the pressure at which the nitrogen condenses). The absorption layer thickness ($t_1$) was then calculated using the relation:

$$t_1 = \frac{13.99}{\sqrt{0.024 - \log (P/P_0)}}$$

the volume (V) of nitrogen adsorbed was then plotted against $t_1$. A straight line was then fitted through the data points for $t_1$ values between 3.9 and 6.2 Angstroms. The t-area was then obtained from the slope of this line as follows:

t-area, $m^2/gm = 15.47 \times$ slope

TABLE 3

| Conditions | |
| --- | --- |
| Air Rate, kscfh | 12.8 |
| Gas Rate, kscfh | 0.94 |
| feedstock rate, lbs/hr | 155 |
| Si compound rate, lbs/hr | 10.3 |

TABLE 4

| Properties | |
| --- | --- |
| % Silicon in Carbon Black | 4.5 |
| DBP, cc/100 g | 115.0 |
| CDBP, cc/100 g | 103.5 |
| t-Area, $m^2/g$ | 121.0 |
| $N_2$ area, $m^2/g$ | 133.0 |

In view of the forgoing disclosure, those skilled in the art will recognize that various modifications can be made to the preferred embodiments discussed above without departing from the true scope and spirit of the invention. The following claims are intended to define the present invention in accordance with such true scope and spirit.

I claim:

1. A base composition comprising
   unsaturated elastomer,
   an aggregate comprising a carbon phase and a silicon-containing species phase, and
   a pre-vulcanization modifier selected from non-silane polysulfidic organo-compounds effective to substantially increase bound rubber content in a non-vulcanized masterbatch composition which would be produced by thermomechanical working of the base composition, including at least a non-productive thermal working stage reaching a maximum temperature sufficient to vulcanize the masterbatch in the presence of a vulcanization system.

2. The base composition of claim 1 wherein the pre-vulcanization modifier is selected from non-silane polysulfidic alkylphenol compounds wherein each alkyl group is independently selected from C1 to C10 alkyl moieties.

3. The base composition in accordance with claim 2 wherein the pre-vulcanization modifier is a non-silane polysulfidic alkylphenol in which each of the alkyl groups is tertiary.

4. The base composition in accordance with claim 1 wherein the pre-vulcanization modifier is selected from the group consisting of tertiary butylphenol polysulfide, dithiodimorpholine, dicaprolactam disulfide and mixtures of any of them.

5. The base composition in accordance with claim 4 wherein the pre-vulcanization modifier is present in an amount between 0.5 and 10 phr.

6. The base composition in accordance with claim 1 wherein said aggregate is oxidized.

7. The base composition in accordance with claim 1 wherein said aggregate contains between 0.1 wt. % and 25 wt. % silicon.

8. The base composition in accordance with claim 1 wherein said aggregate contains between 2 wt. % and 6 wt. % silicon.

9. The base composition in accordance with claim 1 further comprising sulfur in an amount less than 10 phr.

10. The base composition in accordance with claim 9 wherein the unsaturated elastomer consists essentially of solution SBR wherein between 12% to 90% of the butadiene mers are incorporated at the 1,2-position.

11. The base composition in accordance with claim 1 further comprising a silane coupling agent.

12. The base composition in accordance with claim 11 wherein the silane coupling agent is selected from vinyl-terminated silanes and methacrylate terminated silanes.

13. The base composition in accordance with claim 12 wherein the coupling agent is selected from the group consisting of bis(3-triethoxysilylpropyl)tetrasulfane, 3-thiocyanatopropyl-triethoxy silane, vinyltriethoxysilane, methacryloxypropyltrimethoxysilane, vinyl-tris-(2-methoxysilane) and mixtures of any of them, in an amount of 0.1 to 15 parts per hundred of elastomer.

14. A base composition for a sulfur-vulcanizable rubber masterbatch, the base composition comprising:
   sulfur-vulcanizable elastomer selected from the group consisting of solution SBR, natural rubber, functional solution SBR, emulsion SBR, polybutadiene, polyisoprene and mixtures of any of them;
   colloidal filler material containing between 0.1 wt. % and 25 wt. % silicon, wherein said colloidal filler material comprises an aggregate comprising a carbon phase and a silicon-containing species phase further wherein said aggregate is at least one of an aggregate wherein the silicon-containing species phase exists as regions primarily at the surface of the aggregate, and an aggregate wherein the silicon-containing species phase exists primarily as regions distributed throughout said aggregate;
   pre-vulcanization modifier in an amount of 2–6 phr, selected from the group consisting of tertiary butylphenol polysulfide, dithiodimorpholine, dicaprolactum disulfide and mixtures of any of them, effective to substantially increase bound rubber content in a non-vulcanized masterbatch composition produced by a thermomechanical working of the base composition including at least a non-productive thermal working stage sufficient to substantially vulcanize the rubber masterbatch in the presence of a vulcanization system, the thermal working stage reaching a maximum temperature between 130° and 180° C. for a suitable period of time between 10 second and 20 minutes in duration; and treating agent in an amount of 1 to 4 phr, selected from the group of silane compounds consisting of bis(3-triethoxysilylpropyl)tetrasulfane, 3-thiocyanatopropyltriethoxy silane, vinyltriethoxysilane, methacryloxypropyltrimethoxysilane, vinyl-tris-(2-methoxysilane) and mixtures of any of them.

15. A rubber masterbatch comprising an aggregate comprising a carbon phase and a silicon-containing species phase dispersed in SBR elastomer with the reaction product of pre-vulcanization modifier selected from non-silane polysulfidic organo-compounds.

16. A sulfur-vulcanizable rubber masterbatch comprising colloidal filler material containing between 0.1 wt. % and 25 wt. % silicon, wherein said colloidal filler material comprises an aggregate comprising a carbon phase and a silicon-containing species phase, further wherein said aggregate is at least one of an aggregate wherein the silicon-containing species phase exists as regions primarily at the surface of said aggregate, and an aggregate wherein the silicon-containing species phase exists primarily as regions distributed throughout said aggregate, dispersed in sulfur-vulcanizable elastomer selected from the group consisting of solution SBR, natural rubber, functional solution SBR, emulsion SBR, polybutadiene, polyisoprene and mixtures of any of them, with the reaction products of a pre-vulcanization modifier selected from the group consisting of tertiary butylphenol polysulfide, dithiodimorpholine, dicaprolactum disulfide and mixtures of any of them, and of a second treating agent selected from the group consisting of bis(3-triethoxysilylpropyl)tetrasulfane, 3-thiocyanatopropyltriethoxy silane, vinyltriethoxysilane, methacryloxypropyltrimethoxysilane, vinyl-tris-(2-methoxysilane) and mixtures of any of them.

17. A sulfur-vulcanizable rubber masterbatch formed by a process comprising the steps of:

(A) preparing a base composition comprising unsaturated elastomer, an aggregate comprising a carbon phase and a silicon-containing species phase and a pre-vulcanization modifier selected from non-silane polysulfidic organo-compounds effective to substantially increase bound rubber content in a non-vulcanized masterbatch composition resulting from step (B); and (B) thermomechanically working the base composition of step (A) to substantially increase bound rubber content, including at least one thermal working stage reaching a maximum temperature which should be sufficient to vulcanize the base composition in the presence of a vulcanization system.

18. A sulfur-vulcanizable rubber masterbatch formed by a process comprising the steps of:

(A) preparing a base composition comprising colloidal filler material containing between 0.1 wt. % and 25 wt. % silicon, wherein said colloidal filler material comprises an aggregate comprising a carbon phase and a silicon-containing species phase, further wherein said aggregate is at least one of an aggregate wherein the silicon-containing species phase exists as regions primarily at the surface of said aggregate, and an aggregate wherein the silicon-containing species phase exists primarily as regions distributed throughout said aggregate, dispersed in sulfur-vulcanizable elastomer selected from the group consisting of solution SBR, natural rubber, functional solution SBR, emulsion SBR, polybutadiene, polyisoprene and mixtures of any of them, with the reaction products of a pre-vulcanization modifier selected from the group consisting of tertiary butylphenol polysulfide, dithiodimorpholine, dicaprolactum disulfide and mixtures of any of them, and of a second treating agent selected from the group consisting of bis(3-triethoxysilylpropyl)tetrasulfane, 3-thiocyanatopropyltriethoxy silane, vinyltriethoxysilane, methacryloxypropyltrimethoxysilane, vinyl-tris-(2-methoxysilane) and mixtures of any of them; and (B) thermomechanically working the base composition of step (A), including at least one thermal working stage sufficient to vulcanize the rubber masterbatch in the presence of a vulcanization system, the thermal working stage reaching a maximum temperature between 130° and 180° C. for a suitable period of time which is a function of the temperature and of the nature and volume of the components of the masterbatch and which is between 10 second and 20 minutes in duration.

19. A vulcanizable rubber masterbatch formed by a process comprising the steps of:

(A) preparing a base composition comprising unsaturated elastomer, an aggregate comprising a carbon phase and a silicon-containing species phase and a pre-vulcanization modifier selected from non-silane polysulfidic organo-compounds effective to substantially increase bound rubber content in a non-vulcanized masterbatch composition resulting from step (B); and (B) forming a rubber masterbatch by thermomechanically working the base composition of step (A) including at least one thermal working stage reaching a maximum temperature which would be sufficient to vulcanize the base composition in the presence of a vulcanization system; and (C) performing a finishing step comprising adding to the rubber masterbatch a vulcanization system effective to vulcanize the rubber masterbatch at a vulcanization temperature, and thermomechanically working the rubber masterbatch and vulcanization system at a temperature below the vulcanization temperature.

20. A sulfur-vulcanizable rubber masterbatch formed by a process comprising the steps of:

(A) preparing a base composition comprising colloidal filler material containing between 0.1 wt. % and 25 wt. % silicon, wherein said colloidal filler material comprises an aggregate comprising a carbon phase and a silicon-containing species phase, further wherein said aggregate is at least one of an aggregate wherein the silicon-containing species phase exists as regions primarily at the surface of said aggregate, and an aggregate wherein the silicon-containing species phase exists primarily as regions distributed throughout said aggregate, dispersed in sulfur-vulcanizable elastomer selected from the group consisting of solution SBR, natural rubber, functional solution SBR, emulsion SBR, polybutadiene, polyisoprene and mixtures of any of them, with the reaction products of a pre-vulcanization modifier selected from the group consisting of tertiary butylphenol polysulfide, dithiodimorpholine, dicaprolactum disulfide and mixtures of any of them, and of a second treating agent selected from the group consisting of bis(3-triethoxysilylpropyl)tetrasulfane, 3-thiocyanatopropyltriethoxy silane, vinyltriethoxysilane, methacryloxypropyltrimethoxysilane, vinyl-tris-(2-methoxysilane) and mixtures of any of them; and (B) forming a rubber masterbatch by thermomechanically working the base composition of step (A), including at least one thermal working stage which would be sufficient to vulcanize the base composition in the presence of a vulcanization system, reaching a maximum temperature between 130° and 180° C. for a suitable period of time which is between 10 seconds and 20 minutes in duration; and (C) performing a finishing step comprising adding to the rubber masterbatch a sulfur donor vulcanization system which is effective to vulcanize the rubber masterbatch at a vulcanization temperature, and thermomechanically working the rubber masterbatch and vulcanization system at a temperature below the vulcanization temperature.

21. A vulcanized elastomer composition formed by a process comprising the steps of:

(A) preparing a base composition comprising unsaturated elastomer, an aggregate comprising a carbon phase and a silicon-containing species phase and a pre-vulcanization modifier selected from non-silane polysulfidic organo-compounds effective to substantially increase bound rubber content in a non-vulcanized masterbatch composition resulting from step (B); and (B) forming a rubber masterbatch by thermomechanically working the base composition of step (A), including at least one thermal working stage reaching a maximum temperature which would be sufficient to vulcanize the base composition in the presence of a vulcanization system;

(C) then performing a finishing step comprising adding to the rubber masterbatch a vulcanization system comprising a vulcanization agent, an acceleration agent and an activator agent for the vulcanization agent, effective to vulcanize the rubber masterbatch at a vulcanization temperature, and thermomechanically working the rubber masterbatch and vulcanization system at a temperature below the vulcanization temperature; and (D) then vulcanizing the rubber masterbatch.

22. A sulfur vulcanized elastomer composition formed by a process comprising the steps of:

(A) preparing a base composition comprising colloidal filler material containing between 0.1 wt. % and 25 wt. % silicon, wherein said colloidal filler material comprises an aggregate comprising a carbon phase and a silicon-containing species phase, further wherein said aggregate is at least one of an aggregate wherein the silicon-containing species phase exists as regions primarily at the surface of said aggregate, and an aggregate wherein the silicon-containing species phase exists primarily as regions distributed throughout said aggregate, dispersed in sulfur-vulcanizable elastomer selected from the group consisting of solution SBR, natural rubber, functional solution SBR, emulsion SBR, polybutadiene, polyisoprene and mixtures of any of them, with the reaction products of a pre-vulcanization modifier selected from the group consisting of tertiary butylphenol polysulfide, dithiodimorpholine, dicaprolactum disulfide and mixtures of any of them, and of a second treating agent selected from the group consisting of bis(3-triethoxysilylpropyl)tetrasulfane, 3-thiocyanatopropyltriethoxy silane, vinyltriethoxysilane, methacryloxypropyltrimethoxysilane, vinyl-tris-(2-methoxysilane) and mixtures of any of them; and (B) forming a rubber masterbatch by thermomechanically working the base composition of step (A), including at least one thermal working stage which would be effective to vulcanize the rubber masterbatch in the presence of a vulcanization system, reaching a maximum temperature between 130° and 180° C. for a suitable period of time which is between 10 seconds and 20 minutes in duration;

(C) then performing a finishing step comprising adding to the rubber masterbatch a sulfur vulcanization system comprising a vulcanization agent, an acceleration agent and an activator agent for the vulcanization agent, effective to vulcanize the rubber masterbatch at a vulcanization temperature, by thermomechanically working the rubber masterbatch and vulcanization system at a temperature below the vulcanization temperature; and (D) then vulcanizing the rubber masterbatch.

23. A filler pre-mix comprising an aggregate comprising a carbon phase and a silicon-containing species phase in substantially homogenous admixture with a pre-vulcanization modifier selected from non-silane polysulfidic organo-compounds, the filler pre-mix being suitable for admixture with an unsaturated elastomer in a base composition for a rubber masterbatch, and the pre-vulcanization modifier being effective to substantially increase bound rubber content in the rubber masterbatch in a thermomechanical working of the base composition at a vulcanization temperature.

24. A filler pre-mix comprising a substantially homogenous admixture of (B) colloidal filler material containing between 0.1 wt. % and 25 wt. % silicon, wherein said colloidal filler material comprises an aggregate comprising a carbon phase and a silicon-containing species phase, further wherein said aggregate is at least one of an aggregate wherein the silicon-containing species phase exists as regions primarily at the surface of said aggregate, and an aggregate wherein the silicon-containing species phase exists primarily as regions distributed throughout said aggregate; and (C) pre-vulcanization modifier selected from the group consisting of tertiary butylphenol polysulfide, dithiodimorpholine, dicaprolactam disulfide and mixtures of any of them, the filler pre-mix being suitable for a base composition for a rubber masterbatch incorporating sulfur-vulcanizable elastomer selected from the group consisting of solution SBR, natural rubber, functional solution SBR, emulsion SBR, polybutadiene, polyisoprene and mixtures of any of them, and the pre-vulcanization modifier of the filler pre-mix being effective to substantially increase bound rubber content in the rubber masterbatch during thermomechanical working of the base composition at a temperature between 130° C. and 180° C.

25. A filler pre-mix comprising a substantially homogeneous admixture of:
(A) colloidal filler material containing between 0.1 wt. % and 25 wt. % silicon, wherein said colloidal filler material comprises an aggregate comprising a carbon phase and a silicon-containing species phase, further wherein said aggregate is at least one of an aggregate wherein the silicon-containing species phase exists as regions primarily at the surface of said aggregate, and an aggregate wherein the silicon-containing species phase exists primarily as regions distributed throughout said aggregate;
(B) pre-vulcanization modifier selected from the group consisting of tertiary butylphenol polysulfide, dithiodimorpholine, dicaprolactam disulfide and mixtures of any of them, the filler pre-mix being suitable for a base composition for a rubber masterbatch incorporating sulfur-vulcanizable elastomer selected from the group consisting of solution SBR, natural rubber, functional solution SBR, emulsion SBR, polybutadiene, polyisoprene and mixtures of any of them, and the pre-vulcanization modifier of the filler pre-mix being effective to substantially increase bound rubber masterbatch during thermomechanical working of the base composition at a temperature between 130° C. and 180° C.; and
(C) treating agent selected from the group consisting of bis (3 triethoxysilypropyl) tetrasulfane, 3-thioyanatopropyl-triethoxy silane, vinyltriethoxysilane, methacryloxypropyltrimethoxysilane, vinyl-tris-(2-methoxysilane) and mixtures of any of them; wherein the pre-vulcanization modifier of the filler pre-mix is effective to substantially increase bound rubber content in the rubber masterbatch during thermomechanical working of the base composition at a temperature between 130° C. and 180° C.

26. A tire tread formed of a vulcanization elastomer composition comprising an aggregate comprising a carbon phase and a silicon-containing species phase dispersed in vulcanized elastomer with the reaction products of non-silane polysulfidic organo-compounds, said vulcanized elastomer composition formed by a process comprising the steps of:
(A) preparing a base composition unsaturated elastomer, an aggregate comprising a carbon phase and a silicon-containing species phase and a pre-vulcanization modifier selected from non-silane polysulfidic organo-compounds effective to substantially increase bound rubber content in a non-vulcanized masterbatch composition resulting from step (B); and
(B) thermomechanically working the base composition of step (A) to substantially increase bound rubber content, including at least one thermal working stage reaching a maximum temperature which should be sufficient to vulcanize the base composition in the presence of a vulcanization system.

27. A tire tread comprising a vulcanized elastomer composition comprising colloidal filler material containing between 0.1 wt. % and 25 wt. % silicon, wherein said colloidal filler material comprises an aggregate comprising a carbon phase and a silicon-containing species phase, further wherein said aggregate is at least one of an aggregate wherein the silicon-containing species phase exists as regions primarily at the surface of said aggregate, and an aggregate wherein the silicon-containing species phase exists primarily as regions distributed throughout said aggregate, dispersed in sulfur-vulcanized elastomer selected from the group consisting of solution SBR, and natural rubber, functional solution SBR, emulsion SBR, polybutadiene, polyisoprene and mixtures of any of them, with the reaction products of a pre-vulcanization treating agent selected from the group consisting of tertiary butylphenol polysulfide, dithiodimorpholine, dicaprolactam disulfide and mixtures of any of them, and of a treating agent selected from the group consisting of bis(3 triethoxysilylpropyl)tetrasulfane, 3-thiocyanatopropyl-triethoxy silane, vinyltriethoxysilane, methacryloxypropyltrimethoxysilane, vinyl-tris-(2-methoxysilane) and mixtures of any of them.

28. A tire tread comprising vulcanized elastomer composition formed by a process comprising the steps of:
(A) preparing a base composition comprising unsaturated elastomer, an aggregate comprising a carbon phase and a silicon-containing species phase and a pre-vulcanization modifier selected from a non-silane polysulfidic organo-compounds effective to substantially increase bound rubber content in a non-vulcanized masterbatch composition resulting from step (B); and
(B) forming a rubber masterbatch by thermomechanically working the base composition of step (A) including at least one thermal working stage reaching a maximum temperature which would be sufficient to vulcanize the base composition in the presence of a Vulcanization system;
(C) then performing a finishing step comprising adding to the rubber masterbatch a vulcanization system effective to vulcanize the rubber masterbatch at a vulcanization temperature, and thermomechanically working the rubber masterbatch and vulcanization system at a temperature below the vulcanization temperature; and
(D) then vulcanizing the rubber masterbatch.

29. The tire tread in accordance with claim 28 wherein the rubber masterbatch is vulcanized by anaerobic thermal compression in a closed mold.

30. A tire tread comprising sulfur vulcanized elastomer composition formed by a process comprising the steps of:
(A) preparing a base composition comprising colloidal filler material containing between 0.1 wt. % and 25 wt. % silicon, wherein said colloidal filler material comprises an aggregate comprising a carbon phase and a silicon-containing species phase, further wherein said aggregate is at least one of an aggregate wherein the silicon-containing species phase exists as regions primarily at the surface of, said aggregate, and an aggregate wherein the silicon-containing species phase exists primarily as regions distributed throughout said aggregate, dispersed in sulfur-vulcanizable elastomer selected from the group consisting of solution SBR, natural rubber, functional solution SBR, emulsion SBR, polybutadiene, polyisoprene and mixtures of any of them, with the reaction products of a pre-vulcanization modifier selected from the group consisting of bis(3-triethoxysilylpropyl)tetrasulfane, 3-thiocyanatopropyl-triethoxy silane, vinyltriethoxysilane, methacryloxypropyltrimethoxysilane, vinyl-tris-(2-methoxysilane) and mixtures of any of them;
(B) forming a rubber masterbatch by thermomechanically working the base composition of step (A), including at least one thermal working stage which would be effective to vulcanize the rubber masterbatch in the presence of a vulcanization system, reaching a maximum temperature between 130° C. and 180° C. for a suitable period of time which is between 10 seconds and 20 minutes in duration;

(C) then performing a finishing step comprising adding to the rubber masterbatch a sulfur donor vulcanization system which is effective to vulcanize the rubber masterbatch at a vulcanization temperature, by thermomechanically working the rubber masterbatch and vulcanization system at a temperature below the vulcanization temperature; and (D) then vulcanizing the rubber masterbatch by thermomechanically working at a vulcanization temperature.

31. A process for making a rubber masterbatch, comprising the steps of:

(A) preparing a base composition comprising unsaturated elastomer, an aggregate comprising a carbon phase and a silicon-containing species phase and a pre-vulcanization modifier selected from non-silane polysulfidic organo-compounds effective to substantially increase bound rubber content in a non-vulcanized masterbatch composition resulting from step (B); and (B) thermomechanically working the base composition of step (A) to substantially increase bound rubber content, including at least one thermal working stage reaching a maximum temperature which should be sufficient to vulcanize the base composition in the presence of a vulcanization system.

* * * * *